United States Patent [19]

Sundstrom et al.

[11] 4,095,008
[45] June 13, 1978

[54] SYNTACTIC FOAM MATRIX BOARD

[75] Inventors: Donald W. Sundstrom, Storrs; Richard L. Maine, Willimantic, both of Conn.

[73] Assignee: Rogers Corporation

[21] Appl. No.: 604,187

[22] Filed: Aug. 13, 1975

[51] Int. Cl.² .......................... B32B 3/26; B32B 5/18
[52] U.S. Cl. ........................... 428/215; 264/220; 264/293; 264/299; 428/159; 428/306; 428/310; 428/325; 428/406; 428/908
[58] Field of Search ............... 428/306, 308, 309, 908, 428/909, 310, 311, 314, 315, 325, 327, 331, 403, 406, 158–160, 213–215; 260/2.5 F; 264/220, 293, 299

[56] References Cited

U.S. PATENT DOCUMENTS

| | | | |
|---|---|---|---|
| 3,589,961 | 6/1971 | Fordyce et al. | 428/908 |
| 3,707,414 | 12/1972 | Wismer et al. | 428/313 |
| 3,707,434 | 12/1972 | Stayner | 428/308 |
| 3,849,350 | 11/1974 | Matsko | 260/2.5 F |

*Primary Examiner*—William J. Van Balen

[57] ABSTRACT

A matrix board and the method of manufacture thereof are presented wherein the board has a relatively thin carrier sheet, a relatively thick layer of syntactic foam on the carrier sheet and a relatively thin layer of phenolic resin and filler over the relatively thick syntactic foam layer. The matrix board is capable of being molded at low pressures on the order of fifty psi, thus making it particularly suitable for use with rubber and photopolymer pattern or master plates and also making it particularly suitable for formation of deep relief matrix boards.

10 Claims, 2 Drawing Figures

SYNTACTIC FOAM MATRIX BOARD

BACKGROUND OF THE INVENTION

This invention relates to the field of matrix boards for use in the formation of printing plates. More particularly, this invention relates to the field of matrix boards and the method of manufacture of matrix boards which are especially suitable for molding rubber and photopolymer master plates, and also more particularly for the formation of matrix boards having deep relief.

In the manufacture of matrix boards for use in forming flexographic printing plates, impressions are formed in the matrix board by means of a master. The impressioning is usually accomplished by pressing the matrix material against the master plate at relatively high pressure. While engraved metal plates can be used as the masters from which the matrix plates are formed, engraved metal masters are expensive and relatively difficult to make. From the standpoints of economy and ease of manufacture, it is preferable to use rubber or photopolymer materials to form the master plate. However, a serious problem is encountered in the use of rubber or photopolymer masters when it is desired to form deep relief (0.15 inches and greater) impressions in matrix boards to be used for forming deep relief flexographic printing plates. The principal problem is that in order to obtain the desired deep relief impression in the matrix board, high pressure (on the order of 300 psi or more) and heat (on the order of 300° F) must typically be used in pressing the matrix material against the master plate; and this high pressure and heat involved distort the rubber and photopolymer masters whereby unsatisfactory matrices are obtained and/or the masters are damaged.

In order to avoid these problems of distortion and damage to the rubber or photopolymer master resulting from the normal heat and pressure conditions, an alternative industry practice has been established. This alternative practice involves pouring a thermosetting powder into the relief areas of the master pattern. A matrix board is then placed over the master pattern, and heat and pressure are then applied to fuse the powder and bond it to the matrix board. The resulting product is a matrix board which has raised portions corresponding to the relief areas of the master, and this matrix board may be used as a mold for forming rubber or similar type flexographic printing plates. A major drawback with this alternative industry procedure is in the use of the thermosetting powder, which is usually a very fine phenolic powder. The use of powder is inconvenient, messy, time consuming and can pose a health hazard.

SUMMARY OF THE INVENTION

The present invention overcomes the above-discussed and other problems of the prior art and results in a new and improved matrix board and method of manufacture thereof. The matrix board of the present invention has a carrier sheet (ranging from 0.004 to 0.020 inches), a relatively thick layer of a composition of syntactic foam and a thermosetting resin and adhesive (ranging from 0.060 to 0.500 inches), and a relatively thin cover layer of phenolic resin with filler (ranging from 0.015 to 0.040 inches) to smooth out the upper surface of the board. The syntactic foam-resin composition in a wet state, which has a paste-like consistency, is cast onto the carrier sheet. At this point the resin portion of the syntactic foam-resin composition is in a "B" stage or just very slightly cured so that it will respond to heat and pressure. The thin cover layer of phenolic resin, including binder and solvent, is then applied to the upper surface of the syntactic foam. To impression the matrix board, the matrix board is then placed on a master pattern, which may be of rubber or photopolymer material, and the matrix board is molded to the master pattern with heat and pressure to both mold and cure the matrix board. Because of the presence of the syntactic foam, the matrix board molds to the shape of the master pattern at about 50 psi and at a temperature in the range of 300° to 360° F, thus permitting the formation of deep relief matrix boards, with relief depth as deep as 0.150 to 0.200 inches or more. The ability to mold the board at the relatively low pressure of around 50 psi avoids damage to rubber or photopolymer masters and eliminates the undesirable powdering step commonly used in the prior art.

While the matrix board molds at 50 psi, the thermosetting resin is cured so that the molded board can then endure much higher pressures on the order of up to 1000 psi when forming flexographic plates with this matrix.

Accordingly, one object of the present invention is to provide a novel and improved matrix board and method of manufacture of a matrix board for use in forming flexographic printing plates.

Another object of the present invention is to provide a novel and improved matrix board and method of manufacture of a matrix board having deep relief capabilities for forming deep relief flexographic printing plates.

Still another object of the present invention is to provide a novel and improved matrix board and method of manufacture of a matrix board which is capable of being impressioned by a master at low pressures.

Still another object of the present invention is to provide a novel and improved matrix board and method of manufacture of a matrix board capable of deep relief impressioning without the use of thermosetting powder.

Still another object of the present invention is to provide a novel and improved matrix board and method of manufacture of a matrix board which is moldable from a master plate at relatively low pressure but which is able to withstand higher pressures during molding of the flexographic printing plates from the matrix.

Other objects and advantages of the present invention will be apparent to and understood by those skilled in the art from the following detailed description and drawings.

DESCRIPTION OF THE PREFERRED EMBODIMENT

Figure 1:
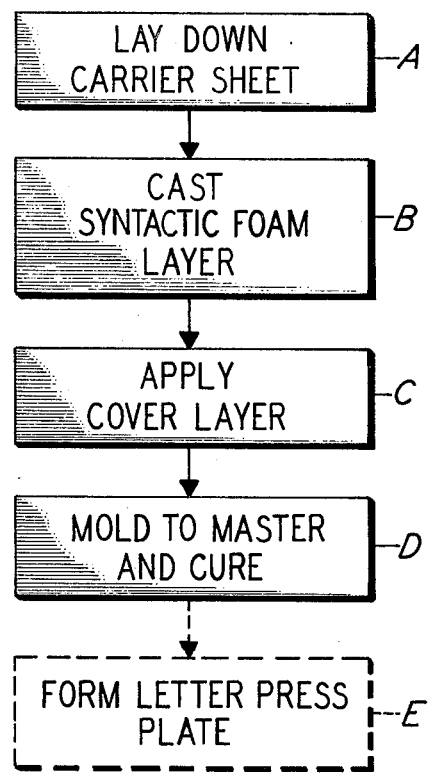
FIG. 1 is a flow diagram showing the method of formation of the matrix board of the present invention.

A matrix material formed in accordance with the present invention will preferably range in thickness from approximately 0.079 inches to approximately 0.560 inches, that range being considered "thick" herein; but it may also be formed in a thinner matrix board down to a thickness size of approximately 0.02 inches while still taking advantage of the low pressure molding feature. Referring to FIG. 1, the matrix material is formed in a process which includes laying down a carrier sheet as shown in step A. The carrier sheet is typically a thin sheet, such as fabric or paper or other material, ranging in thickness from 0.004 to 0.020 inches. A relatively thick layer of syntactic foam is then cast onto the carrier sheet as step B. This relatively thick layer of syntactic foam will preferably range in thickness from 0.060 to 0.500 inches. The syntactic foam consists of hollow particles (referred to herein as microbubbles) dispersed in a polymer structure. The microbubbles need not necessarily be spherical in shape, but they are preferably glass, ceramic or thermosetting resin microspheres ranging in size from ten to three hundred microns. The microbubbles are mixed with a thermosetting resin such as a phenolic resin in a mixture which may also contain fillers and binders (adhesives). The syntactic foam layer is formed by mixing the dry ingredients of the microbubbles and thermosetting resin and filler in a blender or similar mixing device and then adding the mixed dry ingredients to an aqueous solution containing the adhesive. The binder or adhesive is preferably an aqueous latex dispersion. Mixing of the solids and liquids is done in a low shear mixture to minimize breakage of hollow glass bubbles. A solid-liquid suspension of paste-like consistency is formed which is then cast onto the carrier sheet as shown in step B. The surface of the cast syntactic foam layer may then be smoothed if desired, and the wet layer of syntactic foam is allowed to dry. The adhesives in the syntactic foam layer serve to bond the microbubbles to the resin and to give added handling strength to the final board; and the thermosetting resin in the syntactic foam layer impart molding capabilities under heat and pressure. The thermosetting resin in the syntactic foam layer as cast in step B is in a "B" stage or just very slightly cured so that it will respond to heat and pressure in further processing steps. The composition ranges (in weight percentages) of the solid-liquid suspension to be cast, and the composition of the resulting dry syntactic foam layer are as follows:

| Ingredients | Solid-Liquid Suspension | Dried Syntactic Foam Layers |
|---|---|---|
| thermosetting resin | 14–48% | 25–50% |
| microbubbles | 14–42% | 25–75% |
| stearic acid | 0.0–2.8% | 0.0–5% |
| lime | 0.0–0.8% | 0.0–1.5% |
| water | 15–70% | — |
| binder | 3–14% | 5–25% |

The lime is an alkaline agent which acts as a buffer to affect the curing rate of the resin; and the stearic acid is a release agent which promotes release of the matrix material from a mold and also promotes separation of printing plates from the matrix.

After the wet syntactic foam layer is permitted to dry, a thin cover layer of phenolic resin, binder and solvent is then applied in step C to the upper layer of the syntactic foam to provide a smooth thin cover layer for the matrix board. This thin cover layer applied in step C ranges in thickness of 0.015 to 0.040 inches.

Upon the completion of step C, the matrix board is ready to be used by a printer to form a matrix from a master and then to form flexographic printing plates from the matrix. Normally, the matrix board would be formed through step C by the manufacturer of matrix materials, and the matrix boards will be delivered in this unmolded state to distributors or end users. The resulting matrix board upon the completion of Step C is a low density material ranging in density from 0.3 to 0.6 g/cc, it has a smooth upper surface, and it is suitable for deep relief molding at low pressures, deep relief meaning 0.15 inches and greater.

When it is desired to form a sheet of the matrix material into a predetermined pattern, an unmolded matrix board is brought into contact with a previously formed master pattern and is molded to the master pattern with heat and pressure. The molding of the matrix board to the master pattern is done in a molding press at temperatures ranging from 300° to 360° F and at pressures ranging from about 25 psi to 125 psi, and typically preferably at about 50 psi. The preferred molding pressure of 50 psi is an exceptionally low pressure for the molding of matrix boards. Pressures of that low level can be used in the present invention because of the presence of the syntactic foam which collapses, i.e. the microbubbles shatter, in those areas where the master pattern penetrates the matrix board during the molding in step D. The syntactic foam collapses at pressure levels of approximately 50 psi to permit molding of the matrix board to the shape of the master pattern, thus achieving the formation of deep relief areas in the matrix boards, with relief depth as deep as 0.200 inches being achieved at the relatively low pressure level of 50 psi. The ability to mold the matrix board to the master at the relatively low pressure of approximately 25–125 psi permits the use of rubber or photopolymer masters since they will not be damaged at those pressure levels, and thus the undesirable powdering step commonly used in the prior art is eliminated.

In addition to the molding of the matrix board to the shape of the master in step D, the heat of the molding press in step D also cures the thermosetting resin of the syntactic foam layer so that the molded or impressioned syntactic foam layer becomes rigid and achieves a high degree of dimensional stability. Upon removal from the molding press, the molded and cured matrix board is capable of withstanding much higher pressures than the pressure level of from 25 to 125 psi to which it was subjected during the molding process. The molded and cured matrix board is capable of withstanding pressure loads up to 1000 psi without damage or distortion of the matrix board and without loss of the dimensional stability of the matrix board.

After molding and curing of the matrix board as in step D, the matrix board is used to form a flexographic printing plate in step E, which may be accomplished in typical fashion by molding a rubber or similar material into the rigid mold of the matrix board to form a flexographic type printing plate. Since the matrix board formed in accordance with the present invention can withstand higher pressures after molding of the matrix board than before, the flexographic printing plate can be formed in the mold of the matrix board under substantially higher pressures than the matrix board itself can be formed.

The carrier sheet used in formation of the matrix board may be any suitable material such as fabric, paper or synthetic material. The microbubbles used in forming the syntactic foam layer may be any known microcellular or microporous material, and they are preferably glass microspheres. The thermosetting resins, which are phenol formaldehyde resins, are preferably phenolic resins which may be both resole and novolak resins selected to have melting points compatible with the temperature and pressure at which the matrix board is to be molded. The adhesive in the syntactic foam layer is preferably an aqueous latex dispersion. The cover layer is a mixture of phenolic molding material, filler, binder and solvent.

Figure 2:
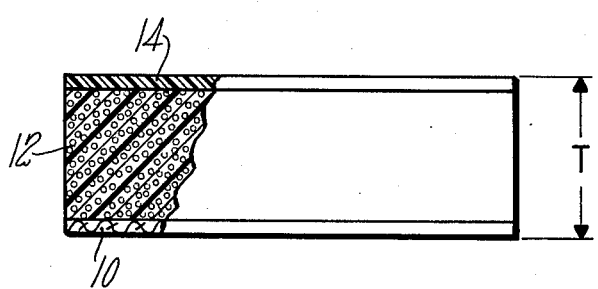
FIG. 2 is a view, partly in section, of a matrix board in accordance with the present invention.

Referring now to FIG. 2, a matrix board is shown as it would appear after having been processed through Step C of FIG. 1. The matrix board includes the thin carrier sheet 10, the relatively thick layer 12 of microbubbles uniformly dispersed in thermosetting resin and adhesive, with the resin being in "B" stage or only slightly cured; and the relatively thin cover layer 14 of phenolic resin and binder. As pointed out above, the matrix board is a relatively thick board with a thickness dimension T preferably ranging from 0.079 to 0.560 inches to accommodate deep relief up to 0.2 inches or even more. However, it will also be understood that a considerably thinner matrix board (such as on the order of 0.02 inches) can also be made to take advantage of the low molding pressure capabilities of the matrix board for shallow relief printing plates.

The following examples illustrate matrix boards made in accordance with the present invention. In each of these examples, a furnish composition was prepared consisting of thermosetting phenolic resin, hollow glass spheres, lime and stearic acid. These dry ingredients were mixed in a blender to achieve a uniform mixture. The mixed dry ingredients were then added to an aqueous solution containing an aqueous latex dispersion binder or adhesive, the adhesive serving mainly to give added handling strength to the final board. The mixed dry ingredients and the aqueous solution were mixed in a low shear mixture to minimize breakage of the hollow glass spheres, and the mixing produced a solid-liquid suspension. The resulting solid-liquid suspension was cast onto the sheet of backing material (in accordance with step B of FIG. 1) to form the cast layer of syntactic foam which was then smoothed and allowed to dry. A cover layer consisting of phenolic resin, wood flour filler, hydroxy ethyl cellulose binder, water and alcohol was then applied in accordance with step C of FIG. 1. The properties of the resulting matrix board in each example were as listed.

EXAMPLES

| Ingredients | Example 1 Wet Mixture | Example 1 Dry Board | Example 2 Wet Mixture | Example 2 Dry Board | Example 3 Wet Mixture | Example 3 Dry Board |
|---|---|---|---|---|---|---|
| Phenolic Resin (Borden SD5602) | 20.00 | 35.71 | 22.40 | 36.55 | 19.60 | 34.99 |
| Phenolic Resin (Borden SD889-73) | — | — | — | — | — | — |
| Microbubbles (Emmerson Cummings IG101) | 28.50 | 50.89 | — | — | 27.93 | 49.86 |
| Microbubbles (Emmerson Cummings FA-A) | — | — | 31.92 | 52.09 | — | — |
| Stearic Acid | 1.00 | 1.79 | 1.12 | 1.83 | 0.98 | 1.75 |
| Lime | 0.50 | .89 | 0.56 | .91 | 0.49 | .87 |
| Water | 40.00 | — | 35.20 | — | 34.68 | — |
| Binder phenolic-polyvinyl acetate mixture (National Starch - Duro-Lok 150) | 10.00 | 10.72 | 8.80 | 8.62 | — | — |
| Binder acrylic latex (Polymer Industries - Polybond SN 208) | — | — | — | — | 16.32 | 12.53 |
| Binder acrylic latex (Polymer Industries - Polymer 47) | — | — | — | — | — | — |

| Ingredients | Example 4 Wet Mixture | Example 4 Dry Board | Example 5 Wet Mixture | Example 5 Dry Board | Example 6 Wet Mixture | Example 6 Dry Board |
|---|---|---|---|---|---|---|

EXAMPLES-continued

| Phenolic Resin (Borden SD5602) | 19.60 | 35.28 | — | — | 16.00 | 33.90 |
|---|---|---|---|---|---|---|
| Phenolic Resin (Borden SD889-73) | — | — | 16.00 | 33.90 | — | — |
| Microbubbles (Emmerson Cummings IG101) | 27.93 | 50.27 | 22.80 | 48.31 | 14.80 | 31.36 |
| Microbubbles (Emmerson Cummings FA-A) | — | — | — | — | 8.00 | 16.95 |
| Stearic Acid | 0.98 | 1.76 | 0.80 | 1.69 | 0.80 | 1.69 |
| Lime | 0.49 | .88 | 0.40 | .85 | 0.40 | .85 |
| Water | 34.17 | — | 48.00 | — | 48.00 | — |
| Binder phenolic-polyvinyl acetate mixture (National Starch - Duro-Lok 150) | — | — | 12.00 | 15.25 | 12.00 | 15.25 |
| Binder acrylic latex (Polymer Industries - Polybond SN 208) | — | — | — | — | — | — |
| Binder acrylic latex (Polymer Industries - Polymer 47) | 16.83 | 11.81 | — | — | — | — |

| Properties | Ex. 1 | Ex. 2 | Ex. 3 | Ex. 4 | Ex. 5 | Ex. 6 |
|---|---|---|---|---|---|---|
| Syntactic Foam Layer Density (g/cc) | 0.420 | 0.600 | 0.375 | 0.328 | 0.290 | 0.368 |
| Syntactic Foam Layer Thickness (in.) | 0.410 | 0.331 | 0.325 | 0.370 | 0.404 | .332 |
| Backer Type | Non Woven | Non Woven | Non Woven | Non Woven | Non Woven | Non Woven |
| Backer Thickness (in.) | .013 | .007 | .007 | .007 | .013 | .013 |
| Filled Phenolic Top Coating Thickness (in.) | .015 | .015 | .015 | .015 | .026 | .020 |
| Total Thickness (in.) | 0.438 | 0.353 | 0.347 | 0.385 | .443 | .369 |

The resulting matrix boards were molded to rubber, photopolymer and/or metal masters in accordance with step D of FIG. 1. Examples 1, 5 and 6 were molded at about 50 psi, while examples 2, 3 and 4 were molded at about 35 psi. The matrix boards were cured in the molding press for from 15-20 minutes at about 310° F. Relief depths of 0.150 inches were formed in the matrix boards of examples 1-4 and 6, and relief depths of 0.200 inches were formed in the matrix board of example 5. The matrix boards were then used to mold flexible rubber printing plates having deep relief of from 0.150 inches to 0.20 inches consistent with the relief areas in the molded matrix board. All of the matrix boards retained good dimensional stability during molding of the printing plates and produced deep relief printing plates having good character definition.

While preferred embodiments have been shown and described various modifications and substitutions may be made thereto without departing from the spirit and scope of the invention. Accordingly, it is to be understood that the present invention has been described by way of illustration and not limitation.

What is claimed is:

1. A matrix board for molding printing plates including:
    a carrier sheet; and
    a layer of syntactic foam on said carrier sheet, said layer of syntactic foam including, by weight, from 25-50% thermosetting resin, said thermosetting resin being not more than partially cured, from 25-75% hollow particles and from 5-25% an aqueous latex dispersion binder;
    said matrix board being deformable under pressure of from 25 psi to 125 psi and curable on exposure to heat to form a matrix board for the molding of printing plates.

2. A matrix board as in claim 1, wherein said layer of syntactic foam further includes:
   from 0–5% release agent; and
   from 0–1.5% alkaline buffer.

3. A matrix board as in claim 1 wherein:
   said carrier sheet is a relatively thin layer of from 0.004 to 0.020 inches; and
   said syntactic foam layer is a relatively thick layer of from 0.060 to 0.500 inches.

4. A matrix board as in claim 3 wherein:
   the thickness of said syntactic foam layer is greater than 0.015 inches; and wherein
   said matrix board is deformable to form deep relief areas having depths of at least 0.15 inches.

5. A matrix board as in claim 1 wherein:
   said thermosetting resin is a phenolic resin.

6. A matrix board as in claim 1 further including: a cover layer including phenolic resin and binder.

7. A matrix board as in claim 6, wherein said layer of syntactic foam further includes:
   from 0–5% release agent; and
   from 0–1.5% alkaline buffer.

8. A matrix board as in claim 6 wherein:
   said carrier sheet is a relatively thin layer of from 0.004 to 0.020 inches;
   said syntactic foam layer is a relatively thick layer of from 0.060 to 0.500 inches; and
   said cover layer is a relatively thin layer of from 0.015 to 0.040 inches.

9. A matrix board as in claim 8 wherein:
   the thickness of said syntactic foam layer is greater than 0.15 inches; and wherein
   said matrix board is deformable to form deep relief areas having depths of at least 0.15 inches.

10. A matrix board as in claim 6 wherein:
    said thermosetting resin is a phenolic resin.

* * * * *